United States Patent
Kong

(10) Patent No.: US 7,328,140 B2
(45) Date of Patent: Feb. 5, 2008

(54) METHOD FOR DESIGNING PASSENGER AIR BAG DOOR FOR INVISIBLE AIRBAG

(75) Inventor: Byung Seok Kong, Ulsan (KR)

(73) Assignee: Hyundai Motor Company, Seoul (KR)

( * ) Notice: Subject to any disclaimer, the term of this patent is extended or adjusted under 35 U.S.C. 154(b) by 619 days.

(21) Appl. No.: 10/887,724

(22) Filed: Jul. 9, 2004

(65) Prior Publication Data

US 2005/0080605 A1  Apr. 14, 2005

(30) Foreign Application Priority Data

Oct. 10, 2003   (KR) ...................... 10-2003-0070603

(51) Int. Cl.
- G06F 7/60  (2006.01)
- G06F 17/10  (2006.01)
- G06F 19/00  (2006.01)
- G06G 7/48  (2006.01)
- B60R 21/20  (2006.01)
- B60R 21/16  (2006.01)

(52) U.S. Cl. ....................... 703/2; 703/6; 703/7; 703/8; 280/728.3; 280/732; 700/97; 700/166

(58) Field of Classification Search ................ 703/6–8, 703/2; 280/728.3, 732; 700/166, 96, 97
See application file for complete search history.

(56) References Cited

U.S. PATENT DOCUMENTS

| | | | | |
|---|---|---|---|---|
| 3,909,582 A | * | 9/1975 | Bowen | ................... 219/121.69 |
| 5,407,225 A | * | 4/1995 | Cooper | ................... 280/728.3 |
| 5,447,327 A | * | 9/1995 | Jarboe et al. | ............. 280/728.3 |
| 5,533,748 A | * | 7/1996 | Wirt et al. | ................. 280/728.3 |
| 5,590,901 A | * | 1/1997 | MacGregor | ............... 280/728.3 |
| 5,728,342 A | * | 3/1998 | Wirt et al. | ................... 264/259 |
| 5,866,224 A | * | 2/1999 | Ang et al. | ..................... 428/43 |
| 6,505,850 B2 | * | 1/2003 | Helfrich et al. | ........... 280/728.3 |
| 2005/0121890 A1 | * | 6/2005 | Kong | ......................... 280/732 |

FOREIGN PATENT DOCUMENTS

| | | |
|---|---|---|
| DE | 19654452 A1 | 1/1998 |
| DE | 60017238 T2 | 12/2005 |
| WO | WO 99/01317 A1 | 1/1999 |
| WO | WO 99/58375 A1 | 11/1999 |

* cited by examiner

Primary Examiner—Paul Rodriguez
Assistant Examiner—Juan Carlos Ochoa
(74) Attorney, Agent, or Firm—Morgan Lewis & Bockius LLP

(57) ABSTRACT

A method for designing a PAB door for an invisible airbag provided to a passenger-side seat of a vehicle includes defining levels of a noise factor depending on a process condition of laser scoring for forming a tearseam on an inner surface of an instrument panel. Control factors and levels of each control factor are defined that affect stress distribution and deformation rate of the tearseam. A combination is arranged that includes levels of the control factors according to an experimental design, inputting each noise factor to each combination and measuring a minimum impulse 'X' that is able to tear the tearseam, and a maximum impulse 'Z' that is unable to tear the tearseam in the case of a head impact. The level of each control factor is selected based on the measured minimum impulse 'X' and the measured maximum impulse 'Z'.

1 Claim, 2 Drawing Sheets

FIG. 3

| CONTROL FACTOR | | LEVEL 1 | LEVEL 2 | LEVEL 3 |
|---|---|---|---|---|
| Symbol | Description | | | |
| A | Folding Type | Roll Type | Zigzag Type | |
| B | Laser Scoring Pitch (mm) | 0.50 | 0.55 | 0.60 |
| C | Shape of Laser Scoring | CUT HOLE | LONG-LONG | LONG-SHORT |
| D | Thickness of Chute (mm) | 2.0 | 2.5 | 3.0 |
| E | Number of Chute Ribs | Longitudinal (2.0t) | Longitudinal-lateral | Longitudinal-lateral |
| F | Door Plate Thickness (mm) | 1.0 | 1.2 | 1.4 |
| G | Thickness of PAB Mounting Br | 1.0 | 1.4 | 2.0 |
| H | Shape of Mounting Bracket Ho | | | |

METHOD FOR DESIGNING PASSENGER AIR BAG DOOR FOR INVISIBLE AIRBAG

CROSS REFERENCE TO RELATED APPLICATIONS

This application claims priority of Korean Application No. 10-2003-0070603, filed on Oct. 10, 2003, the disclosure of which is incorporated herein by reference.

TECHNICAL FIELD OF THE INVENTION

Generally, this invention relates to an airbag apparatus for a vehicle. More particularly, a passenger-side air bag (PAB) door is provided for covering an airbag for a passenger-side seat.

BACKGROUND OF THE INVENTION

Typically, an advanced airbag has been developed and is utilized to prevent or minimize injury to a passenger from a frontal impact at a low speed or an out of position (OOP) related injury. An invisible passenger-side airbag is an airbag wherein an inner surface of the instrument panel is scored by a laser such that a PAB door is formed by a tearseam. The conventional PAB door is also adapted to the advanced airbag.

However, employing the invisible tearseam technique with an advanced airbag includes the drawback that the inflating pressure of the advanced airbag may not be sufficient to tear the tearseam and expose the airbag to the passenger. Accordingly, the tearseam is often scored more deeply to facilitate tearing by the advanced airbag.

However, a drawback of the deeper scoring is that when the vehicle speed at impact is lower than the predetermined speed at which the passenger-side airbag is operated, an impact to the PAB door by a passengers head or body often tears the tearseam. Thereafter, the passenger is subjected to injury by the sharp portions of the torn tearseam.

SUMMARY OF THE INVENTION

A PAB door of a passenger-side invisible airbag includes defining levels of a noise factor depending on process conditions of laser scoring for forming the tearseam on the inner surface of an instrument panel. Defining control factors and levels of each control factor affecting the stress distribution and deformation rate of the tearseam. Arranging a combination comprising levels of the control factors according to an experimental design. Inputting each noise factor to each combination and measuring the minimum impulse 'X' that is able to tear the tearseam of the PAB door by operation of the passenger-side airbag, and the maximum impulse 'Z' that is not able to tear the tearseam of the PAB door in the case of a head impact. The method also includes selecting the level of each control factor based on the measured minimum impulse 'X' and the measured maximum impulse 'Z'.

BRIEF DESCRIPTION OF THE DRAWINGS

For a better understanding of the present invention reference should be made to the following detailed description read in conjunction with the figures, in which:

FIG. 3 illustrates a series of exemplary control factors and the levels of the control factors.

DETAILED DESCRIPTION OF PREFERRED EMBODIMENTS

Figure 1:
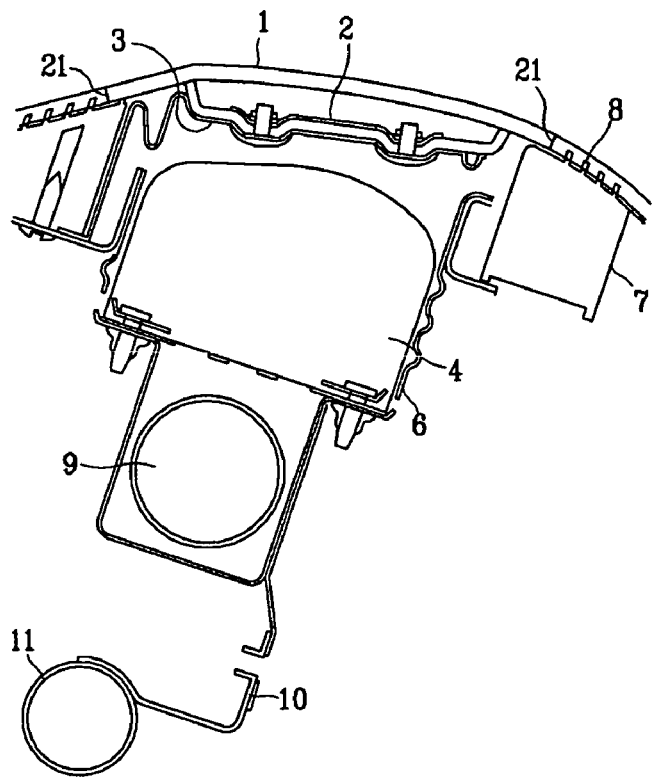
FIG. 1 illustrates a sectional view of an instrument panel of a vehicle including an invisible airbag provided to a passenger-side seat according to an embodiment of the present invention.

According to FIG. 1, an inflator 9, an airbag housing 6, an airbag 4, a door plate 3, a chute 7 comprising ribs 8, and a reaction plate 2 are mounted inside of an instrument panel. A cover 1 of the PAB door is sectioned by a tearseam 21, which is formed by laser scoring.

When the airbag 4 is momentarily filled with gas generated from the inflator 9, the reaction plate 2 is pressured against the cover 1 of the PAB door such that the tearseam 21 is torn. Mounting bracket 10 on a rear of the housing 6 is connected to a cowl cross bar 11, and is resistant to the reaction force caused by inflation of the airbag 4. The chute 7 and the reaction plate 2 are fixed to the instrument panel by vibration welding such that deformation of the impact portion of the instrument panel can be prevented and the PAB door can be opened.

Figure 2:
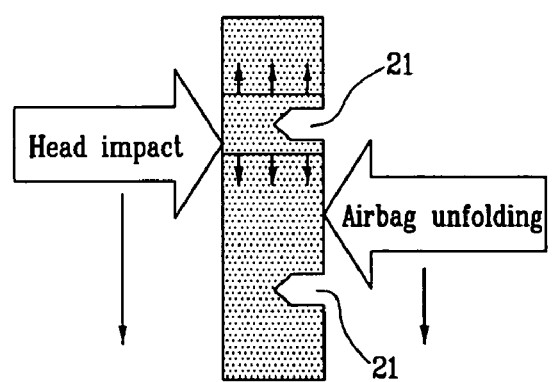
FIG. 2 illustrates a sectional view of a PAB door having a tearseam formed on the inner surface of an instrument panel according to an embodiment of the present invention.

As shown in FIG. 2, the tearseam 21 is scored on the inner surface of the instrument panel such that, when the airbag inflates, the tearseam 21 is torn and the PAB door is opened.

When an impact is applied to the vehicle and the vehicle speed is more than a predetermined speed, the inflator generates gases such that an impulse force is applied to the PAB door. However, when an impact is applied to the vehicle but the vehicle speed is not more than the predetermined speed, the inflator does not function. Under these conditions a head or body of a passenger may impact the instrument panel at the position where the tearseam 21 is located. In either case, inflating the airbag or a head or body impact, an impulse force is applied to the PAB door.

Hereinafter, the minimum impulse that is capable of tearing the tearseam 21 of the PAB door is defined as 'X' and the maximum impulse that is not able to tear the tearseam 21 of the PAB door is defined as 'Z'. It is preferable that the tearseam 21 of PAB door is easily torn for operating of the airbag, and is torn with difficulty in the case of a head or body impact. Accordingly, it is required that the 'X' value becomes smaller, and the 'Z' value becomes larger.

The impulses 'X' and 'Z' are calculated as integrals of force with respect to time until the tearseam 21 is torn. Accordingly, both 'X' and 'Z' depend on time as well as force such that the influence of the structures around the tearseam 21 need to be considered. In order to estimate whether the PAB door is properly designed, noise factors and control factors are defined. The noise factors are the components that affect output responses and they depend on process conditions of laser scoring for forming a tearseam 21 on the inner surface of the instrument panel. For example, the noise factors can be defined as in Table 1.

TABLE 1

| Noise factor | Process condition of laser scoring hole | | Description |
| --- | --- | --- | --- |
| | Residual depth (mm) | Diameter (mm) | |
| N1 | 0.12 | 0.4 | Excessive processing |
| N2 | 0.15 | 0.35 | Standard processing |
| N3 | 0.12 | 0.3 | Insufficient processing |

Meanwhile, control factors are components that affect the stress distribution and the deformation rate of the tearseam 21. For example, when the rigidity of the chute is insufficient, the chute would be excessively deformed by inflation of the airbag. The excessive deformation of the chute prevents inflation pressure from being uniformly applied to the PAB door such that the tearseam 21 would not be torn because of the lack of inflating pressure, or the time for tearing of the tearseam 21 may be increased more than expected.

Accordingly, the chute type should be defined as a control factor. Each chute type defined according to a characteristic related to its rigidity, such as thickness and number of ribs, is respectively designated to each level. A series of exemplary control factors and the levels of the control factors are illustrated in FIG. 3.

After defining the noise factor and the control factor, combinations according to an experiment design are arranged. Each combination is evaluated under conditions such that each of the noise factors N1, N2, and N3 are inputted in turn such that the minimum impulse capable of tearing the tearseam 21 of the PAB door (defined as 'X'), and the maximum impulse that is unable to tear the tearseam 21 of the PAB door (defined as 'Z'), are measured.

The measured 'X' and 'Z' are illustrated with S/N ratios in Table 2, as follows:

TABLE 2

|   | A | B | C | D | E | F | G | H | N1 | N2 | N3 | N1 | N2 | N3 | S/N ratio |
|---|---|---|---|---|---|---|---|---|----|----|----|----|----|----|-----------|
|   |   |   |   |   |   |   |   |   |    | X  |    |    | Z  |    |           |
| 1  | 1 | 1 | 1 | 1 | 1 | 1 | 1 | 1 | 5.2 | 6.5  | 7.8  | 16.4 | 20.5 | 24.6 | 9.51  |
| 2  | 1 | 1 | 2 | 2 | 2 | 2 | 2 | 2 | 5.6 | 6.6  | 7.9  | 15.2 | 19.0 | 22.8 | 8.60  |
| 3  | 1 | 1 | 3 | 3 | 3 | 3 | 3 | 3 | 5.0 | 6.6  | 7.9  | 17.0 | 21.0 | 24.1 | 9.64  |
| 4  | 1 | 2 | 1 | 1 | 2 | 2 | 3 | 3 | 5.5 | 6.9  | 9.5  | 18.0 | 22.5 | 27.0 | 9.20  |
| 5  | 1 | 2 | 2 | 2 | 3 | 3 | 1 | 1 | 5.0 | 6.3  | 7.6  | 18.2 | 22.8 | 29.0 | 10.80 |
| 6  | 1 | 2 | 3 | 3 | 1 | 1 | 2 | 2 | 6.0 | 7.0  | 8.4  | 20.0 | 25.0 | 30.0 | 10.45 |
| 7  | 1 | 3 | 1 | 2 | 1 | 3 | 2 | 3 | 7.2 | 9.0  | 10.8 | 22.0 | 26.0 | 31.2 | 9.97  |
| 8  | 1 | 3 | 2 | 3 | 2 | 1 | 3 | 1 | 7.4 | 9.2  | 10.0 | 21.1 | 26.4 | 37.0 | 9.32  |
| 9  | 1 | 3 | 3 | 1 | 3 | 2 | 1 | 2 | 8.4 | 10.5 | 12.6 | 21.0 | 26.2 | 31.4 | 7.47  |
| 10 | 2 | 1 | 1 | 3 | 3 | 2 | 2 | 1 | 4.0 | 5.0  | 6.0  | 16.8 | 21.0 | 26.0 | 12.05 |
| 11 | 2 | 1 | 2 | 1 | 1 | 3 | 3 | 2 | 4.5 | 5.1  | 6.1  | 15.6 | 19.5 | 23.4 | 10.99 |
| 12 | 2 | 1 | 3 | 2 | 2 | 1 | 1 | 3 | 4.1 | 5.1  | 6.4  | 18.0 | 20.0 | 24.0 | 11.67 |
| 13 | 2 | 2 | 1 | 2 | 3 | 1 | 3 | 2 | 4.5 | 5.6  | 6.7  | 18.4 | 23.0 | 27.6 | 11.80 |
| 14 | 2 | 2 | 2 | 3 | 1 | 2 | 1 | 3 | 4.2 | 5.3  | 6.3  | 19.6 | 24.5 | 29.4 | 12.91 |
| 15 | 2 | 2 | 3 | 1 | 2 | 3 | 2 | 1 | 5.4 | 6.0  | 7.5  | 17.6 | 22.0 | 28.0 | 10.52 |
| 16 | 2 | 3 | 1 | 3 | 2 | 3 | 1 | 2 | 6.8 | 8.5  | 10.2 | 20.0 | 25.0 | 30.0 | 8.90  |
| 17 | 2 | 3 | 2 | 1 | 3 | 1 | 2 | 3 | 6.4 | 8.0  | 9.9  | 23.7 | 26.4 | 34.0 | 10.36 |
| 18 | 2 | 3 | 3 | 2 | 1 | 2 | 3 | 1 | 8.0 | 9.5  | 11.4 | 16.8 | 21.0 | 25.2 | 6.32  |

The S/N ratios shown in Table 2 are calculated according to the below equation.

$$S/N \text{ ratio} = S/N(X) + S/N(Z)$$

$$= 10\log\frac{1}{\frac{1}{n}\sum X_i^2} + 10\log\frac{1}{\frac{1}{n}\sum \frac{1}{Z_i^2}}$$

$$= 10\log\frac{1}{\frac{1}{n^2}\left[\left(\sum X_i^2\right)\left(\sum \frac{1}{Z_i^2}\right)\right]}$$

wherein:

n: number of noise factors;

X: Minimum impulse that is able to tear the tearseam 21 for operation of passenger-side airbag;

Z: Maximum impulse that is unable to tear the tearseam 21 in the case of a head or body impact;

As described above, it is preferable that the 'X' becomes smaller, and the 'Z' becomes larger. Accordingly, as the S/N ratio increases, it can be concluded that a preferable airbag design is achieved. In order to choose the most preferable level of each control factor, the average of each S/N ratio with respect to each level of control factors is calculated. Then, a preferable level of each control factor having the largest average of S/N ratios is selected. Table 3, below, illustrates the averages of the S/N ratios of Table 2 according to each level of the control factors.

TABLE 3

|   | A | B | C | D | E | F | G | H |
|---|---|---|---|---|---|---|---|---|
| 1 | 9.33  | 10.41 | 10.07 | 9.86  | 9.86  | 10.52 | 10.21 | 9.76  |
| 2 | 10.61 | 10.95 | 10.50 | 9.70  | 9.70  | 9.43  | 10.16 | 9.70  |
| 3 |       | 8.56  | 9.35  | 10.55 | 10.35 | 9.97  | 9.54  | 10.46 |

With respect to each of the control factors of Table 4, the level of each control factor with the maximum S/N ratio is selected and the most preferable combination of levels of control factors are determined as shown in Table 4, as follows:

TABLE 4

| A | B | C | D | E | F | G | H |
|---|---|---|---|---|---|---|---|
| 2 | 2 | 2 | 3 | 3 | 1 | 1 | 3 |

The PAB door of the passenger-side airbag according to the combination as shown in Table 4 can therefore be expected to be easily torn in the case of operation of the airbag, and to be difficult to tear in the case of a head or body impact.

What is claimed is:

1. A method for designing a passenger-side air bag door for an invisible airbag for a passenger-side seat of a vehicle, comprising:

determining levels of a noise factor depending on a process condition of laser scoring for forming a tearseam on an inner surface of an instrument panel;

determining control factors and levels of each control factor that affect a stress distribution and deformation rate of the tearseam;

arranging combinations comprising levels of the control factors according to an experimental design;

inputting each noise factor to each combination and measuring a minimum impulse 'X' that is able to tear the tearseam of the passenger-side air bag door for operation of the passenger-side airbag, and a maximum impulse 'Z' that is unable to tear the tearseam of the passenger-side air bag door in a case of a head or body impact;

selecting a level of each control factor based on the measured minimum impulse 'X' and the measured maximum impulse 'Z'; and designing and manufacturing the tearseam of the passenger-side air bag door to tear based on the level of each control factor, wherein selecting the level of each control factor comprises:

calculating each signal to noise "S/N" ratio with respect to each combination of the control factors according to the equation:

$$S/N \text{ ratio} = S/N(X) + S/N(Z)$$
$$= 10\log\frac{1}{\frac{1}{n}\sum X_i^2} + 10\log\frac{1}{\frac{1}{n}\sum \frac{1}{Z_i^2}}$$
$$= 10\log\frac{1}{\frac{1}{n^2}\left[\left(\sum X_i^2\right)\left(\sum \frac{1}{Z_i^2}\right)\right]}$$

wherein n: number of noise factors

X: Minimum impulse that is able to tear the tearseam for operation of the passenger-side airbag Z: Maximum impulse that is unable to tear the tearseam in the case of a head impact calculating each average of S/N ratios with respect to each level of control factors; and selecting a level of each control factor having a largest average of the S/N ratios.

* * * * *